United States Patent

Asami et al.

[11] Patent Number: 5,926,593
[45] Date of Patent: Jul. 20, 1999

[54] OPTOCOUPLER

[75] Inventors: Keisuke Asami; Akishige Ito, both of Tokyo, Japan

[73] Assignee: Ando Electric Co., Ltd., Tokyo, Japan

[21] Appl. No.: 08/953,213

[22] Filed: Oct. 17, 1997

[30] Foreign Application Priority Data

Oct. 21, 1996 [JP] Japan .................................. 8-278358

[51] Int. Cl.⁶ .................................................. G02B 6/32
[52] U.S. Cl. .............................. 385/34; 385/11; 385/33; 385/72; 385/74
[58] Field of Search ............................... 385/11, 33, 34, 385/72, 74, 92, 93

[56] References Cited

U.S. PATENT DOCUMENTS

| | | | |
|---|---|---|---|
| 3,829,195 | 8/1974 | Rawson | 385/34 X |
| 5,087,109 | 2/1992 | Ishizuka et al. | 385/34 |
| 5,221,839 | 6/1993 | Braun | 385/34 X |
| 5,499,132 | 3/1996 | Tojo et al. | 385/34 X |
| 5,539,577 | 7/1996 | Si et al. | 385/34 X |
| 5,689,360 | 11/1997 | Kurata et al. | 385/34 X |
| 5,734,762 | 3/1998 | Ho et al. | 385/11 |
| 5,796,889 | 8/1998 | Xu et al. | 385/24 |
| 5,832,153 | 11/1998 | Duck | 385/34 |
| 5,859,940 | 1/1999 | Takahashi et al. | 385/34 |

*Primary Examiner*—Brian Healy
*Attorney, Agent, or Firm*—Flynn, Thiel, Boutell & Tanis, P.C.

[57] ABSTRACT

The invention provides an optocoupler having excellent characteristics whereby both polarization dependency and optical coupling loss can be minimized. A first optical fiber is formed such that an end face thereof is at a predetermined angle with the axis thereof. A first refraction index distribution lens converts light beams sent out from the first optical fiber into collimated light beams, and sends out the collimated light beams in a direction of directional cosine of the end face of the first optical fiber. A second refraction index distribution lens condenses the collimated light beams sent out from the first refraction index distribution lens. A second optical fiber is formed such that an end face thereof is at the predetermined angle with the axis thereof, and optically couples the light beams condensed by the second refraction index distribution lens on the end face thereof. Non-reflective coating is applied to the end face of the first optical fiber and the second optical fiber, respectively, and the optical fibers are disposed such that the directional cosine of the end face of first optical fiber intersects same of the second optical fiber at an angle of 180°.

5 Claims, 3 Drawing Sheets

OPTOCOUPLER

BACKGROUND OF THE INVENTION

1. Field of the Invention

The present invention relates to an optocoupler, and in particular, to an optocoupler for optical coupling between optical fibers.

2. Description of the Related Art

An optocoupler is generally used for causing outgoing light from an end face of an optical fiber to fall on another optical fiber. It is important for the optocoupler to be able to cause outgoing light from an optical fiber to fall on another optical fiber without loss and generation of optical noises.

FIG. 3 is a side view showing an example of a conventional optocoupler. In FIG. 3, reference numeral 1 is an optical fiber circular in section, and an end face 1a thereof is formed at a predetermined angle θ of tilt with a plane normal to the axis of the optical fiber, and in shape of an ellipse. The tilt is provided primarily to prevent a light beam propagating through the optical fiber, and reflected at the end face 1a, from propagating in the opposite direction. Owing to the tilt of the end face 1a, the outgoing direction of an outgoing light beam from the end face 1a is deviated from the axis of the optical fiber 1. In this specification, the term "the axis of an optical fiber" refers to the central axis of the optical fiber.

Hereinafter in this specification, one of the extremities of the major axis of the end face 1a is designated by a vertex 1b, a cosine component of a vector from the center of the end face 1a to the vertex 1b thereof by a directional cosine of the end face 1a, and a cosine component of a vector from the center of an end face 4a described hereinafter to a vertex 4b of the end face 4a by a directional cosine of the end face 4a.

Reference numeral 2 denotes a refractive index distribution lens having the shape of a cylinder, disposed such that the central axis 2c thereof is deviated from the axis of the optical fiber 1, and arranged such that end faces 2a and 2b thereof intersect a straight line extended from the axis of the optical fiber 1 substantially at right angles. The refractive index distribution lens 2 converts incoming light beams falling on the end face 2a into collimated light beams, which are then sent out from the end face 2b.

Reference numeral 3 is a refractive index distribution lens, similar to the refractive index distribution lens 2, having the central axis 3c thereof set at a position deviated from the axis of the optical fiber 1 and the central axis 2c of the refractive index distribution lens 2, respectively, and arranged such that an end face 3a is disposed opposite to the end face 2b of the refractive index distribution lens 2 so that the collimated light beams falling on the end face 3a are converted into spherical waves, and condensed on an end face 4a of an optical fiber 4 described hereinafter.

The optical fiber 4 is circular in section, similarly to the optical fiber 1, and formed such that the end face 4a is at the predetermined angle θ of tilt with a plane perpendicular to the axis of the optical fiber 4. The end face 4a has the shape of an ellipse, similarly to the end face 1a. The optical fiber 4 is arranged such that the axis thereof is set at a position deviated from the axis of the optical fiber 1, the central axis 2c of the refractive index distribution lens 2, and the central axis 3c of the refractive index distribution lens 3, and further, the end face 4a is disposed opposite to the end face 3b of the refractive index distribution lens 3, with its distance from the end face 3b being set according to the focal length of the refractive index distribution lens 3. Furthermore, the optical fiber 4 is disposed such that the directional cosine of the end face 4a thereof intersects the directional cosine of the end face 1a of the optical fiber 1 at right angles.

In the optocoupler constituted as above, light beams propagating through the optical fiber 1 are sent out from the end face 1a at an angle of aperture, determined by refractive index and refractive index distribution of both a core and cladding of the optical fiber 1, and the diameter of the core. Since the end face 1a is formed at the angle θ of tilt with a plane perpendicular to the axis of the optical fiber 1, the angle of aperture is asymmetrical with respect to the axis of the optical fiber 1, and deviated towards the direction of the directional cosine of the end face 1a. The light beams outgoing from the end face 1a of the optical fiber 1 fall on the end face 2a of the refractive index distribution lens 2, and are converted into collimated light beams, which are then sent out from the end face 2b. The collimated light beams sent out from the end face 2b fall on the end face 3a of the refractive index distribution lens 3, are condensed, and sent out from the end face 3b. The light beams sent out from the end face 3a are focused on the end face 4a of the optical fiber 4, enter into the optical fiber 4, and propagate therein.

In the conventional optocoupler, the direction of the outgoing light beams is set in a direction deviated from the axis of the optical fiber 1 by forming the end face 1a of the optical fiber 1 at the predetermined angle θ with the plane perpendicular to the axis of the optical fiber 1 as described in the foregoing so that light beams reflected at the end faces 2a, 2b, of the refractive index distribution lens 2, and same at the end faces 4a, 4b, of the optical fiber 4 do not propagate in the reverse direction, thus preventing generation of optical noises. The contents of description stated above is included in the application for patent, made by the applicant (reference: Japanese Patent Laid-open No. H 8-179639).

Meanwhile, since the end face 1a of the optical fiber 1 and the end face 4a of the optical fiber 4 are formed at the predetermined angle θ with the plane perpendicular to the axis of the optical fiber 1 and the optical fiber 4, respectively, transmissivity and reflectivity at the end faces 1a and 4a, respectively, have polarization dependency. Hence, loss of light at the end faces 1a and 4a, respectively, has polarization dependency (such a loss is hereinafter referred to as "PDL"). The directional cosine of the end face 1a of the optical fiber 1 is arranged so as to intersect that of the end face 4a of the optical fiber 4 at right angles as described above in order to cause PDL at the end face 1a of the optical fiber 1 to cancel out PDL at the end face 4a of the optical fiber 4 so that overall PDL of the optocoupler is held down to a minimum. The contents of description stated above is included in the application for patent, made by the applicant (Japanese Patent Laid-open No. H 8 - 162158).

With reference to the PDL, supplementary explanation is stated hereinafter. In case that a relative position of the end face 1a of the optical fiber 1 to the end face 4a of the optical fiber 4 is as shown in FIG. 3, the PDL of the optocoupler as a whole can be held down to a low level. In case that the relative position of the end faces described above is instead as shown in FIG. 4 or FIG. 5, the overall PDL can not be held down to a low level. FIGS. 4 and 5 are side views showing other examples of the conventional optocoupler wherein parts in common with same in FIG. 3 are designated by common reference numerals, and explanation thereof is omitted.

A conventional optocoupler shown in FIG. 4 differs from the conventional optocoupler shown in FIG. 3 in that in FIG.

4, the directional cosine of the end face 1a of the optical fiber 1 is set in the same direction as that for the directional cosine of the end face 4a of the optical fiber 4, and the position of the refractive index distribution lens 3, relative to the refractive index distribution lens 2, and the position of the optical fiber 4, relative to the refractive index distribution lens 3, are changed.

Changing the positions of the refractive index distribution lens 2, the refractive index distribution lens 3, and the optical fiber 4 is necessitated owing to a change in the direction of the directional cosine of the end face 4a of the optical fiber 4 in order to maximize optical coupling in the optical fiber 4.

With the constitution described above, refraction and aberration of light beams become greater when the collimated light beams converted by the refractive index distribution lens 2 are condensed by the refractive index distribution lens 3, creating a problem of an increase in optical coupling loss at the end face 4a of the optical fiber 4.

Further, a conventional optocoupler shown in FIG. 5 differs from the conventional optocoupler shown in FIG. 3 in that in FIG. 5, the directional cosine of the end face 1a of the optical fiber 1 is set in a direction opposite to that of the directional cosine of the end face 4a of the optical fiber 4 (that is, an angle formed by the two directional cosines is 180°), and similarly to the case of FIG. 4, the position of the refractive index distribution lens 3, relative to the refractive index distribution lens 2, and the position of the optical fiber 4, relative to the refractive index distribution lens 3, are changed owing to a change in the direction of the directional cosine of the end face 4a in order to maximize optical coupling at the end face 4a of the optical fiber 4.

With the constitution described above, however, refraction and aberration of light beams become smaller when the collimated light beams converted by the refractive index distribution lens 2 are condensed by the refractive index distribution lens 3, contributing to reduction in optical coupling loss at the end face 4a of the optical fiber 4.

In the case of the optocoupler constituted as shown in FIG. 4 or FIG. 5, however, the PDL at the end face 1a of the optical fiber 1, and same at the end face 4a of the optical fiber 4 are added together, resulting in an increase of the overall PDL of the optocoupler as a whole.

FIGS. 6 and 6(a)–(d) shows is a chart showing a relative position of the optical fiber 1 and the optical fiber 4, and a correlation between the PDL and overall optical coupling loss. In the lower part of the figure, the relative position of the optical fiber 1 and the optical fiber 4 is shown. In the figure, (a)–(d) denote cases of an angle formed by the directional cosine of the end face 1a of the optical fiber 1 and same of the end face 4a of the optical fiber 4 being 0°, 90°, 180°, and 270°, respectively, and curves of the PDL and optical coupling loss, shown in the figure, indicate results obtained by varying the angle formed by the directional cosines continuously in the range from 0° to 270°.

As shown in FIG. 6, in the case of (c), the optical coupling loss is at the minimum but the PDL reaches a maximum value. In the cases of (b) and (d), the PDL is at the minimum but the optical coupling loss becomes greater than that in the case of (c).

Accordingly, in the case of the conventional optocouplers, it has been impossible to minimize both the PDL and the optical coupling loss.

SUMMARY OF THE INVENTION

The present invention has been accomplished in view of the drawbacks of the conventional optocouplers described above, and it is an object of the invention to provide an optocoupler having excellent characteristics such that both the PDL and the optical coupling loss can be minimized.

BRIEF DESCRIPTION OF THE DRAWINGS

FIGS. 2 and 2(a)–(d) shows a chart showing a correlation between PDL and overall optical coupling loss in the case of the optocoupler according to the embodiment of the invention.

FIGS. 6 and 6(a)–(d) shows a chart showing a relative position of an optical fiber 1 and an optical fiber 4, and a correlation between PDL and overall optical coupling loss in the case of a conventional optocoupler.

DESCRIPTION OF THE PREFERRED EMBODIMENTS

Figure 1:
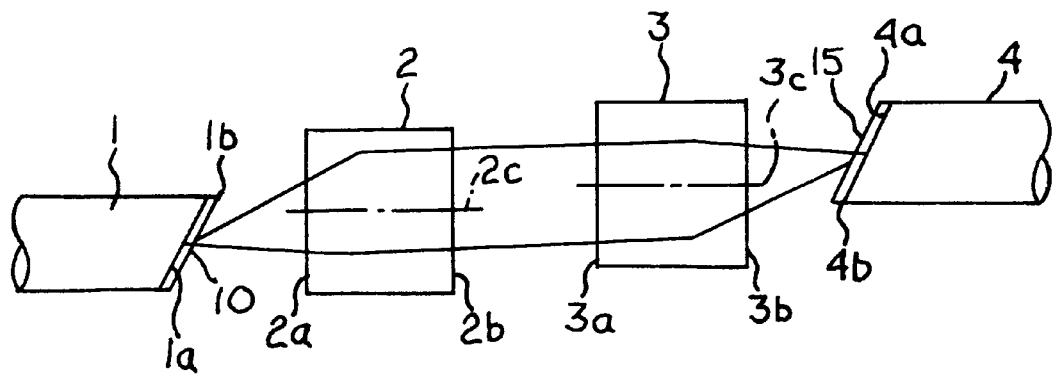
FIG. 1 is a side view showing the constitution of an optocoupler according to an embodiment of the invention.
Figure 2:
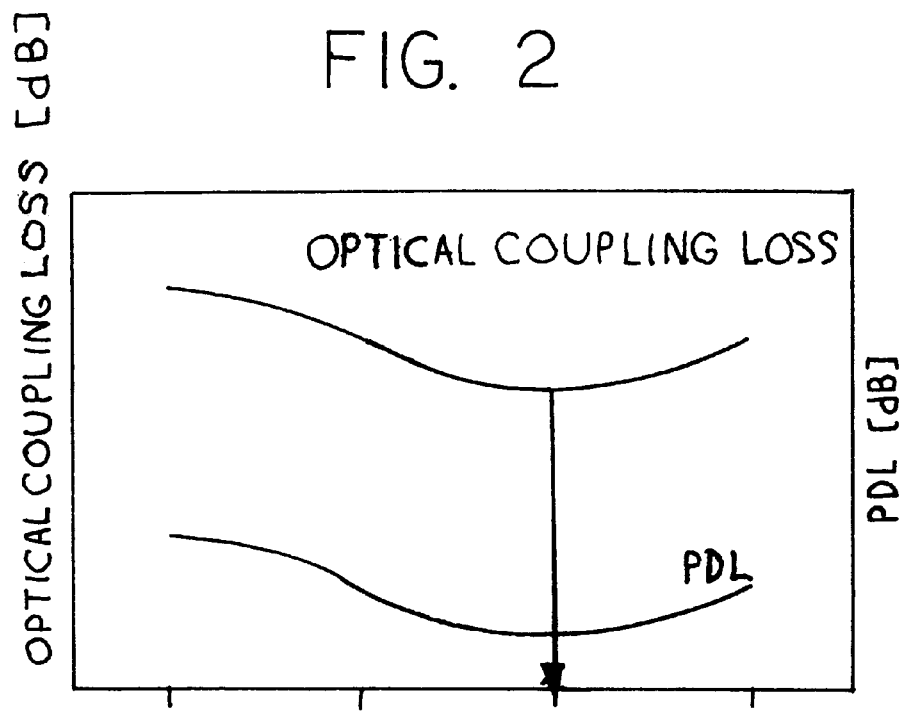
Figure 2:
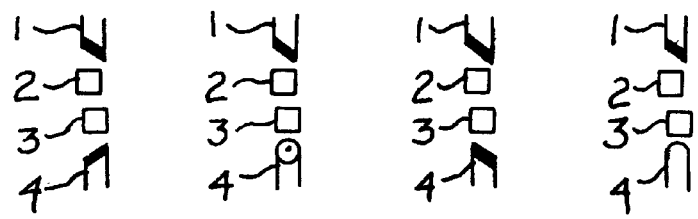
Figure 3:
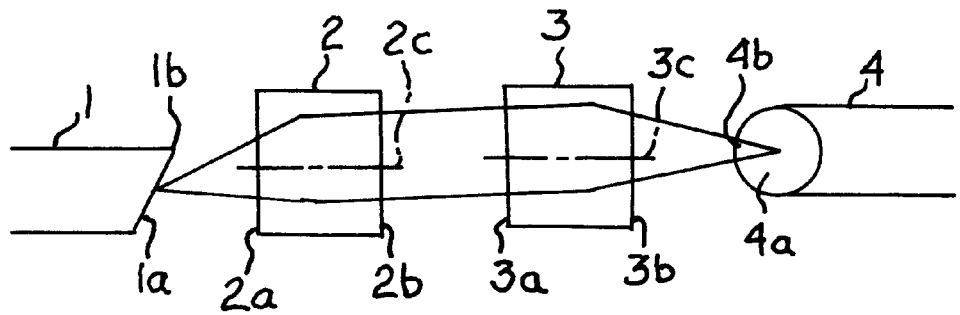
FIG. 3 is a side view showing an example of a conventional optocoupler.
Figure 4:
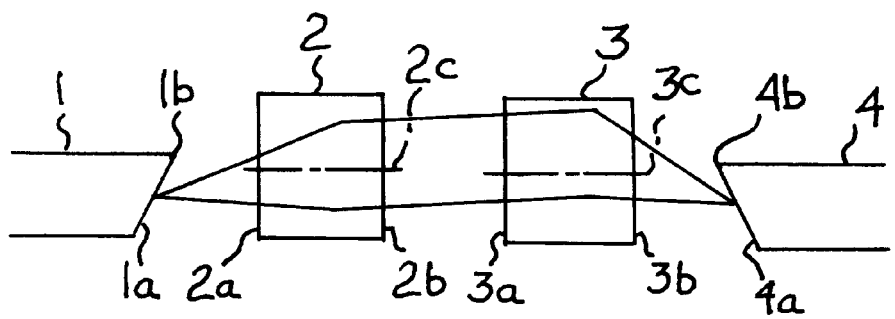
FIG. 4 is a side view showing another example of a conventional optocoupler.
Figure 5:
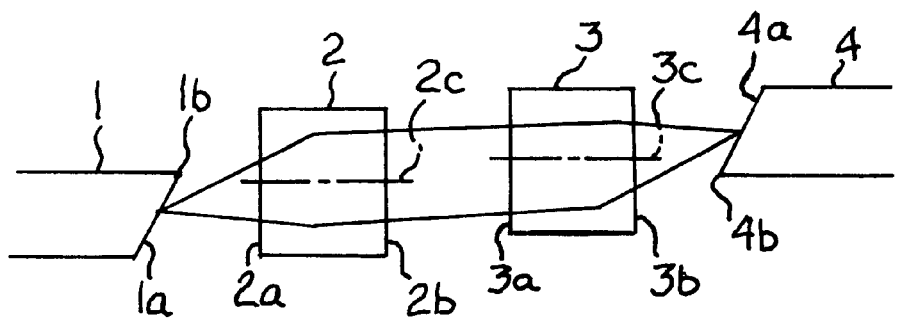
FIG. 5 is a side view showing yet another example of a conventional optocoupler.
Figure 6:
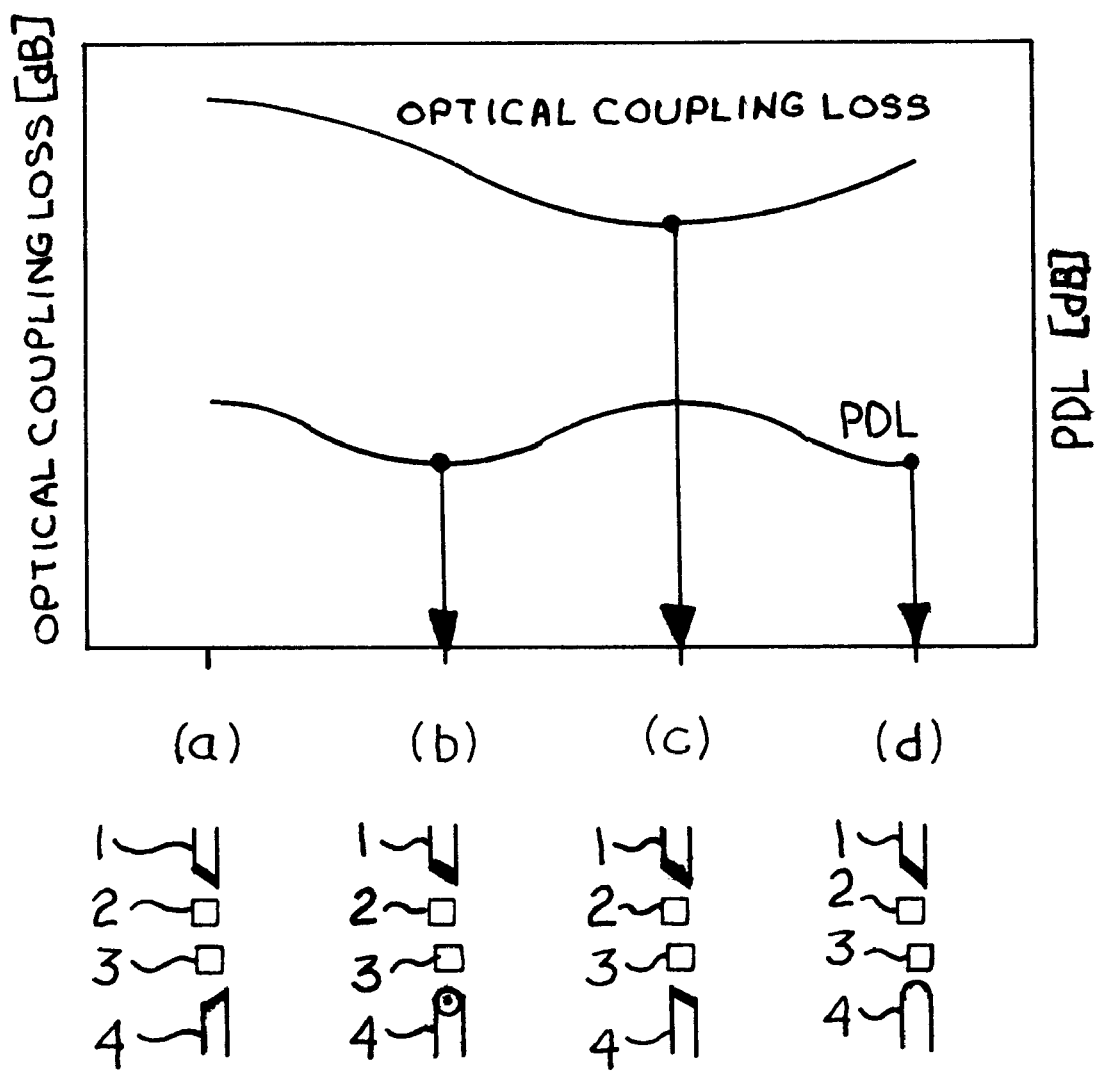

Now referring to drawings, an embodiment of the invention is described hereinafter. FIG. 1 is a side view showing the constitution of an optocoupler according to an embodiment of the invention, and parts therein in common with same of the conventional optocoupler shown in FIG. 5 are denoted by the same reference numerals.

In FIG. 1, reference numeral 1 denotes an optical fiber circular in section, and formed such that an end face 1a is at a predetermined angle θ of tilt with a plane perpendicular to the axis of the optical fiber 1, and has the shape of an ellipse. The tilt is provided so that outgoing light beams from the end face 1a are sent out in a direction deviated from the axis of the optical fiber 1. Further, non-reflective coating 10 is applied to the end face 1a of the optical fiber 1.

With reference to the embodiment of the invention, one of the extremities of the major axis of the end face 1a is referred to as a vertex 1b. A cosine component of a vector from the center of the end face 1a to the vertex 1b of the end face 1a is referred to as a directional cosine of the end face 1a, and a cosine component of a vector from the center of an end face 4a described hereinafter to a vertex 4b of the end face 4a as a directional cosine of the end face 4a.

Reference numeral 2 is a refractive index distribution lens in the shape of a cylinder wherein a central axis 2c thereof is set at a position deviated from the axis of the optical fiber 1, and end faces 2a and 2b thereof are arranged so as to intersect a straight line extended from the optical axis of the optical fiber 1 substantially at right angles. The refractive index distribution lens 2 converts light beams falling on the end face 2a into collimated light beams, which are then sent out of the end face 2b.

Reference numeral 3 is a refractive index distribution lens, similar to the refractive index distribution lens 2, wherein a central axis 3c thereof is set at a position deviated from the axis of the optical fiber 1, and the central axis 2c of the refractive index distribution lens 2, and an end face 3a thereof is disposed, opposite to the end face 2b of the refractive index distribution lens 2, so that the collimated light beams falling on the end face 3a are converted into spherical waves, which are then condensed on an end face 4a of an optical fiber 4 described hereinafter.

The optical fiber 4 is circular in section, similarly to the optical fiber 1, and formed such that an end face 4a is at a predetermined angle θ of tilt with a plane perpendicular to the axis of the optical fiber 4, and has the shape of an ellipse, similarly to the end face 1a. The optical fiber 4 is disposed such that the axis thereof is set at a position deviated from the axis of the optical fiber 1, the central axis 2c of the refractive index distribution lens 2, and the central axis 3c of the refractive index distribution lens 3 while an end face 4c thereof is disposed opposite to the end face 3b of the refractive index distribution lens 3. A distance between the end face 3b and 4a is set according to a focal distance of the refractive index distribution lens 3. Further, an angle formed by the directional cosine of the end face 1a of the optical fiber 1 and the directional cosine of the end face 4a of the optical fiber 4 is set at 180°. In addition, non-reflective coating is applied to the end face 4a of the optical fiber 4.

With the constitution as described above, light beams propagating through the optical fiber 1 are sent out from the end face 1a at an angle of aperture, determined by refractive index and refractive index distribution of both a core and cladding of the optical fiber 1, and the diameter of the core. Since the end face 1a is formed the angle θ of tilt with a plane perpendicular to the axis of the optical fiber 1, the angle of aperture is asymmetrical with respect to the axis of the optical fiber 1, and deviated towards the direction of the directional cosine of the end face 1a. The light beams outgoing from the end face 1a of the optical fiber 1 fall on the end face 2a of the refractive index distribution lens 2, and are converted into collimated light beams, which are then sent out from the end face 2b. The collimated light beams sent out from the end face 2b fall on the end face 3a of the refractive index distribution lens 3, are condensed, and sent out from the end face 3b. The light beams sent out from the end face 3a are focused on the end face 4a of the optical fiber 4, enter into the optical fiber 4, and propagate therein.

Now a relative position of the optical fiber 1 to the optical fiber 4, and a correlation between PDL and overall optical coupling loss are explained hereinafter. FIGS. 2 and 2(a)–(d) shows the correlation between PDL and overall optical coupling loss in the case of the optical coupler according to the embodiment of the invention. In the lower part of the figure, the correlation between the optical fiber 1 and the optical fiber 4 is shown. In the figure, (a)–(d) denote cases of an angle formed by the directional cosine of the end face 1a of the optical fiber 1 and same of the end face 4a of the optical fiber 4 being 0°, 90°, 180°, and 270°, respectively, and curves of the PDL and optical coupling loss, shown in the figure, indicate results obtained by varying the angle formed by the directional cosines continuously in the range from 0° to 270°.

The end face 1a of the optical fiber 1 and the end face 4a of the optical fiber 4 are formed to make the predetermined angle, respectively, with a plane perpendicular to the axis of the respective optical fibers, and in order to lower a proportion of rebounding light beams to the light beams outgoing from the end face 1a of the optical fiber 1, said angle needs to be enlarged to some extent. Enlargement of the angle, however, brings about an increase in the PDL.

Notwithstanding the above, the PDLs occurring at the end face 1a of the optical fiber 1 and the end face 4a of the optical fiber 4 are rendered no longer dominant against overall PDL of the optocoupler as a whole by applying non-reflective coatings 10, and 15 to the end face 1a of the optical fiber 1 and the end face 4a of the optical fiber 4, respectively. As a result, the characteristic of the PDL, proportional to the optical coupling loss, is obtained.

Thus both the optical coupling loss and the PDL are minimized in the case of (c) wherein the non-reflective coatings 10, and 15 are applied to the end face 1a of the optical fiber 1 and the end face 4a of the optical fiber 4, respectively.

With the optocoupler according to the invention as described above, disposition of a first optical fiber and a second optical fiber, providing optimum optical coupling loss, coincides with disposition of the first optical fiber and the second optical fiber, providing optimum PDL so that both the optical coupling loss and the PDL can be held down to a low level. Furthermore, the optocoupler according to the invention has an excellent characteristic over conventional optocouplers without non-reflective coating applied thereon because the non-reflective coating contributes to reduction in an amount itself of light beams reflected from the end face of the first and second optical fibers, respectively, resulting in improved transmission coefficient and lower optical coupling loss.

What is claimed is:

1. An optocoupler comprising:
   a first optical fiber formed such that one end face thereof is at a predetermined angle with the axis thereof,
   a first refractive index distribution lens for converting light beams sent out from the first optical fiber into collimated light beams, and sending out the collimated light beams in a direction deviated towards a directional cosine of one end face of the first optical fiber,
   a second refractive index distribution lens for condensing the collimated light beams, and
   a second optical fiber provided with one end face formed at the predetermined angle with the axis thereof, and for optical coupling of the condensed light beams on one end face thereof, wherein one end faces of the first and second optical fibers are formed to reduce an amount of light beams reflected therefrom, and the directional cosine of one end face of the first optical fiber intersects a directional cosine of one end face of the second optical fiber at an angle for minimizing an optical coupling loss and a loss having polarization dependency.

2. The optocoupler according to claim 1, wherein non-reflective coating is applied to one end faces of the first and second optical fibers for reducing an amount of light beams reflected therefrom.

3. The optocoupler according to claim 1, wherein the angle for minimizing optical coupling loss and the loss having polarization dependency is 180°.

4. The optocoupler according to claim 1, wherein the first and second optical fibers are circular in cross section and each one end thereof is elliptical, and the first and second refractive index distribution lenses are cylindrical.

5. The optocoupler according to claim 1, wherein the first refractive index distribution lens has a central axis which is set at a position deviated from the axis of the first optical fiber, and both end faces which are arranged so as to intersect a straight line extended from the optical axis of the first optical fiber substantially at right angles, said first refractive index distribution lens converting light beams falling on one end face into collimated light beams, which are then sent out from another end face, and wherein the second refractive index distribution lens has a central axis which is set at a position deviated from the axis of the first optical fiber, and the central axis of the first refractive index distribution lens, and one end face thereof is disposed, opposite to another end face of the first refractive index distribution lens, so that the collimated light beams falling on one end face thereof are converted into spherical waves, which are then condensed on one end face of the second optical fiber, and further wherein the second optical fiber has a central axis which is set at a position deviated from the axis of the first optical fiber, the central axis of the first refractive index distribution lens, and the central axis of the second refractive index distribution lens while one end face thereof is disposed opposite to another end face of the second refractive index distribution lens, and a distance between another end face of the second refractive index distribution lens and one end of the second optical fiber is set according to a focal distance of the second refractive index distribution lens.

* * * * *